Patented June 27, 1939

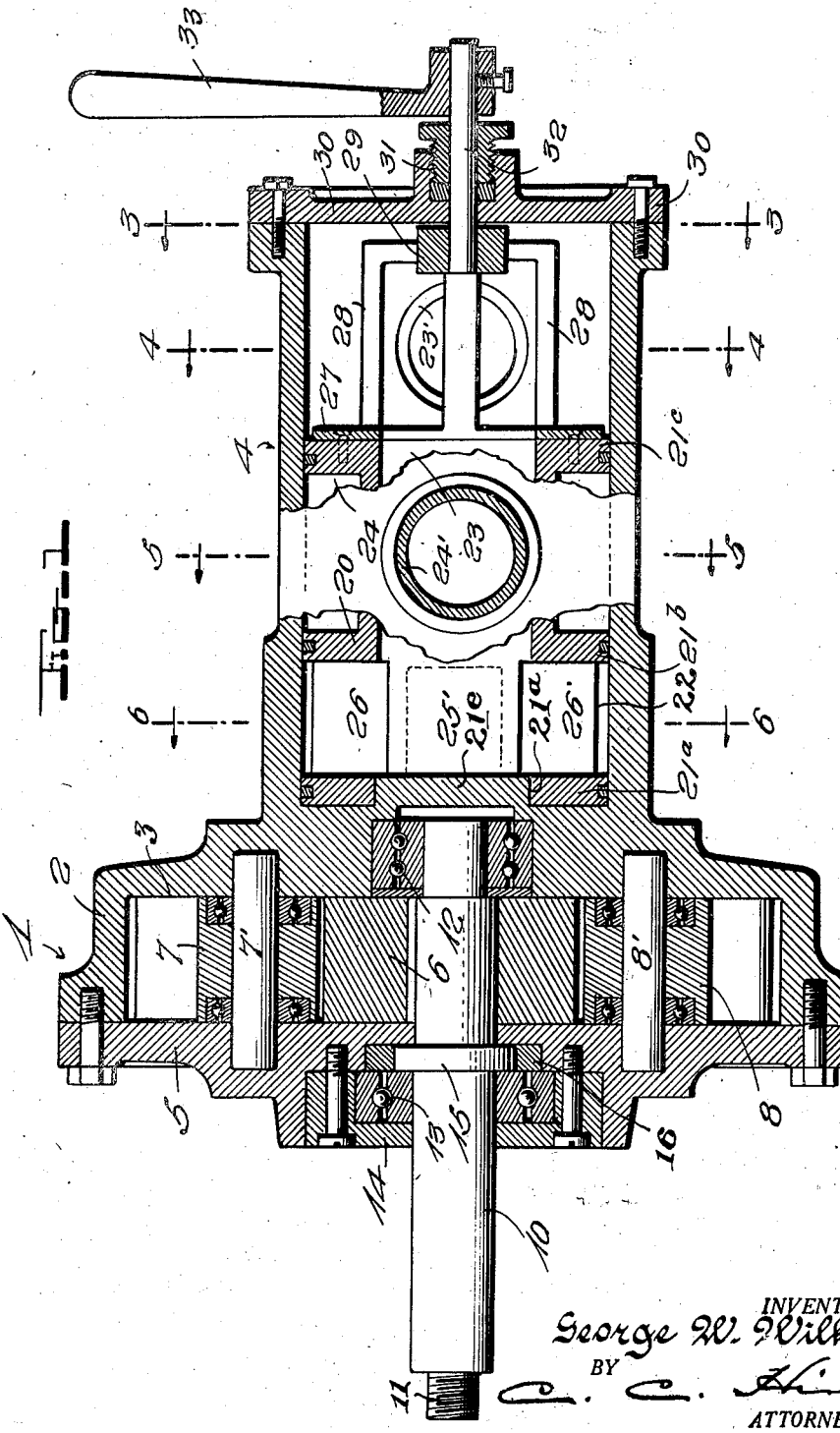

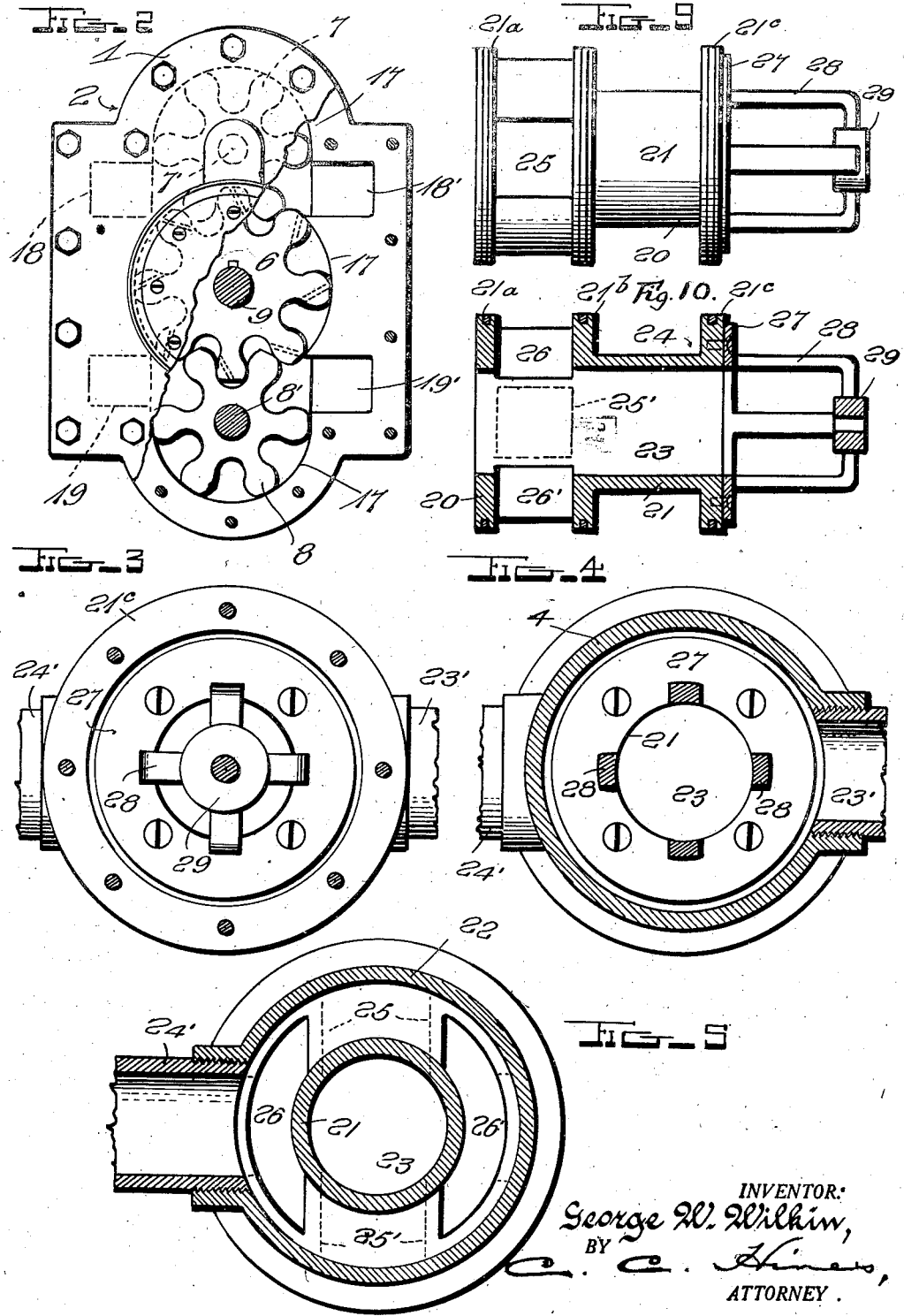

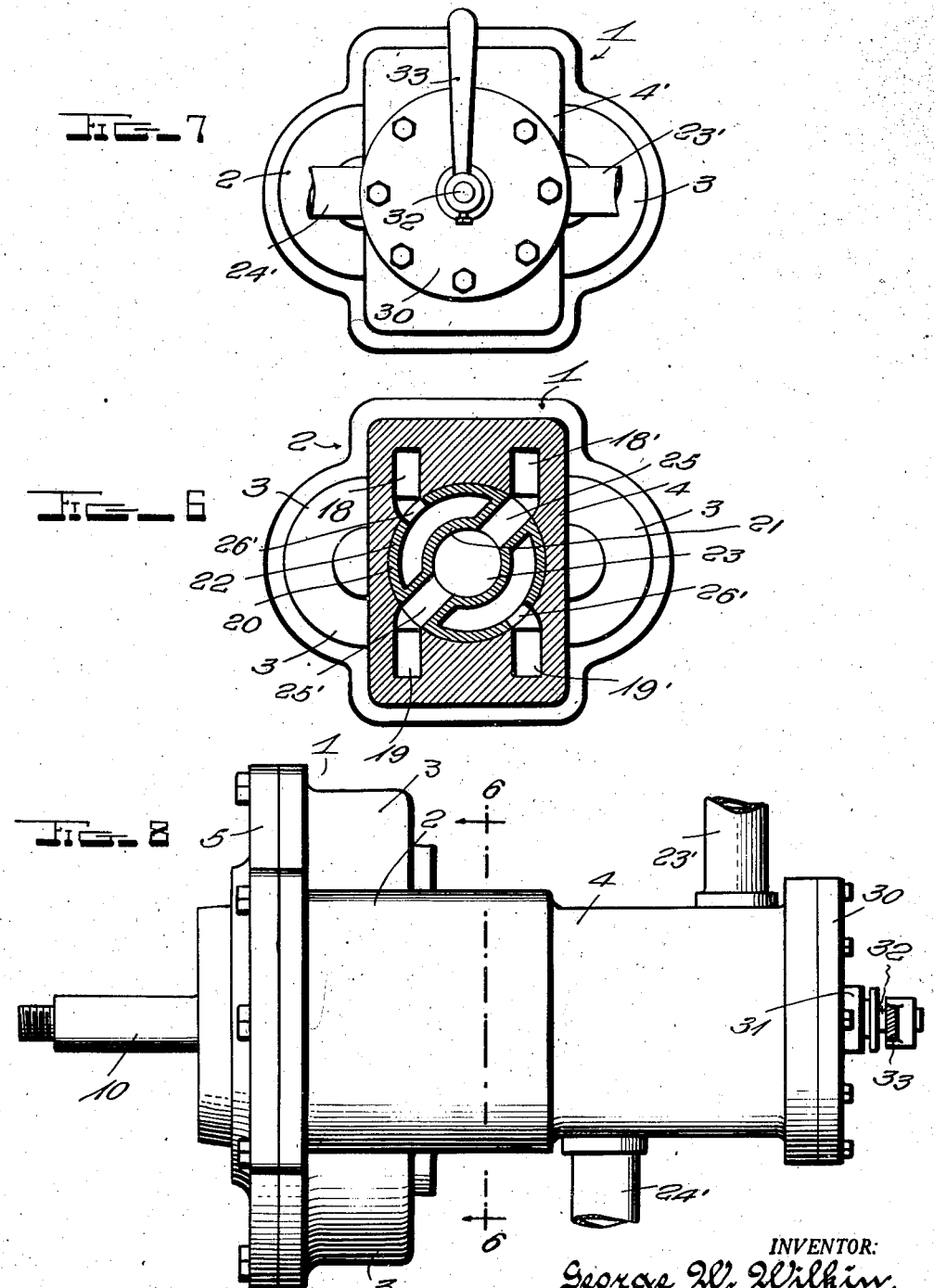

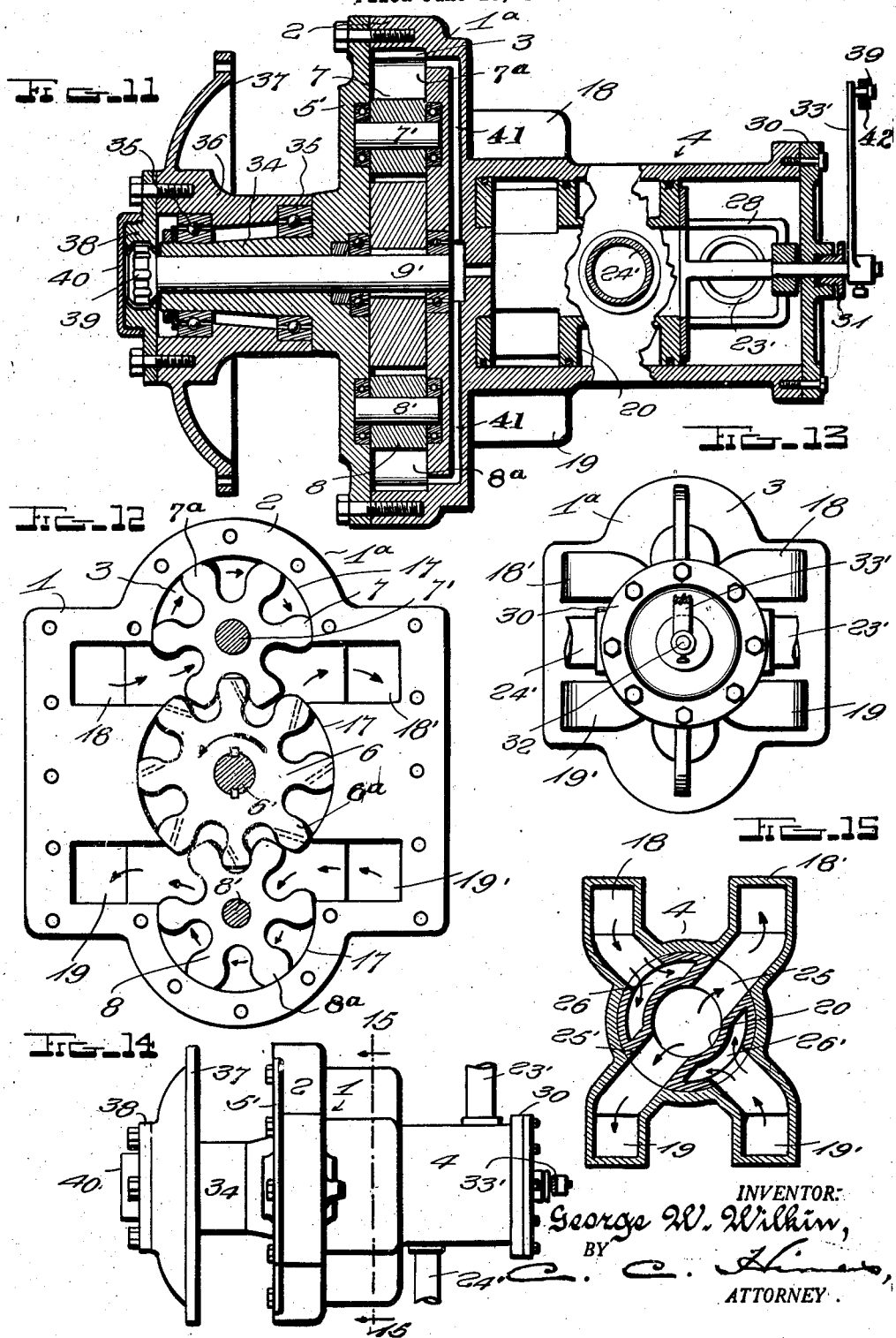

2,163,652

UNITED STATES PATENT OFFICE 2,163,652

HYDRAULIC MOTOR

George W. Wilkin, Spokane, Wash.

Application June 18, 1937, Serial No. 148,991

3 Claims. (Cl. 121—70)

This invention relates to improvements in hydraulic motors.

One object of the invention is to provide a hydraulic gear type motor for driving machinery, machine elements, or the wheels of automobiles or other power vehicles, which is highly flexible in service for driving actions at all speeds within a predetermined speed range, and which will deliver a maximum amount of power from the driving fluid at any and all speeds.

Another object of the invention is to provide a reversible gear type motor which is simple of construction, reliable and efficient in action, durable and adapted to be manufactured and sold at a comparatively low cost, and which may be easily and quickly controlled in operation to accelerate or decelerate the speed of the driven element, to brake it for speed control as required or to lock it against rotation.

With these and other objects in view, the invention consists of the features of construction, combination and arrangement of parts, hereinafter fully described and claimed, reference being had to the accompanying drawings, in which:—

Fig. 1 is a vertical longitudinal section through one form of hydraulic motor embodying my invention.

Fig. 2 is a front end elevation thereof with parts broken away and in section.

Fig. 3 is a cross-section on line 3—3 of Fig. 1.

Figs. 4, 5 and 6 are cross-sections on the lines 4—4, 5—5 and 6—6 of Figs. 1 and 8.

Fig. 7 is a rear end elevation of the motor.

Fig. 8 is a plan view of the same.

Fig. 9 is a side elevation of the controlling valve.

Fig. 10 is a longitudinal section of the same.

Fig. 11 is a view similar to Fig. 1 of the motor as constructed for driving an automobile wheel or the like.

Fig. 12 is a front view of the motor shown in Fig. 11 with parts removed.

Fig. 13 is a rear end elevation of the motor shown in Fig. 11.

Fig. 14 is a plan view of the same.

Fig. 15 is a cross-section on line 15—15 of Fig. 14.

Referring now more particularly to Figs. 1 to 10, inclusive, the motor 1 as designed for general purposes comprises a casing 2 having an enlarged gear-chamber portion 3 and formed to provide at the rearward side of said gear-chamber a reduced annular valve-chamber 4. The gear-chamber 3 is normally open at its forward side for application and removal of parts and is closed at said side in service by a detachable combined bearing and cover plate 5. The interior of the gear-chamber 3 is provided with portions suitably formed to receive a series of three driving gears comprising a central gear-member 6 and gear-members 7 and 8 disposed at diametrically opposite sides thereof. These gear-members are provided with propelling teeth 7a and 8a which are in intermeshing engagement with the teeth 6a of gear member 6 for the transfer of power from the gear-members 7 and 8 to the gear member 6. The gear member 6 is keyed to a central shaft 9 which is provided at its outer end with an outwardly projecting spindle portion 10 threaded or otherwise constructed at 11 for mounting a pulley or other power transmitting element (not shown) thereon. The shaft is journaled in anti-friction bearings 12 and 13 of ball or roller type disposed in bearing chambers in the body of the casing and in the cover plate 5, respectively. The chamber for the bearing 13 is normally open at its outer side and is closed in service by a detachable closure 14. Between its body and spindle portions the shaft is provided with an annular flange 15 which serves to hold the shaft from longitudinal displacement and which is disposed in a packing chamber or recess formed in the cover-plate on the inner side of the bearing 13, which chamber or recess contains a sealing packing 16 preferably of suitable type to prevent undue passage of lubricant to the bearing 13 from gear chamber 3 while permitting passage of sufficient lubricant to said bearing 13 to lubricate the same.

The gears 7 and 8 are mounted for rotation upon stationary shafts 7' and 8' fitted in the casing body and cover plate and are designed for free rotation in either of their directions of revolution to transmit power to the central gear 6 in a uniform manner to drive the shaft 9 to effect its rotation in either a clockwise or a counter-clockwise direction. The portions of the chamber 3 in which the gears rotate are provided with suitably curved wall portions 17 with which the peripheries of the teeth of the gears contact during the non-meshing portions of their orbits of rotation, the contact engagement being sufficiently close to prevent undue leakage of the power fluid past the teeth so that an effective driving action will be secured. The central gear 6 is preferably provided with a greater number of teeth than the teeth of the gears 7 and 8 in order to increase its bearing contact with the curved portions 17 of the casing walls which its teeth engage, to accurately center said gear in its rotation as well as to prevent leakage of the fluid past the teeth of this gear, so that the propulsive force of the fluid will be concentrated and directed against the teeth of the gears 7 and 8.

In the present instance each gear 7 and 8 is provided with six teeth, while the gear 6 is provided with two additional teeth or eight teeth in all, but the number of working teeth on the gears may be varied as desired.

The casing 2 is provided with an upper pair of ports 18 and 18' for cooperation with the gear 7 and a lower pair of ports 19 and 19' for cooperation with the gear 8, the ports of each pair being adapted to serve alternately as intake and exhaust ports. These ports also communicate with the valve chamber 4 for cooperation with an oscillatory control valve 20 therein. This valve 20 comprises a tubular body portion 21 carrying spaced disks or heads 21a, 21b, 21c, and a cylindrical shell portion 22 extending between the heads 21a and 21b and surrounding the forward part of the tubular portion 21 and disposed in spaced relation thereto and concentric relation therewith. The bore of the tubular body portion 21 provides a longitudinally extending intake passage 23, and that part of the body portion 21 which connects the heads 21b and 21c provides with the wall of the valve casing or chamber 4 an annular exhaust passage 24. The space between the forward part of the tubular body portion 21 and the shell portion 22 is partitioned to provide an annular series of ports 25, 25' and 26, 26' for cooperation with the ports 18, 18' and 19, 19', the ports 25 and 25' being radially arranged and communicating directly with the intake passage 23, and the ports 19 and 19' being separated from the ports 25, 25' and in communication through channels opening through the head 21b with the exhaust passage 24. The intake and exhaust passages 23 and 24 cooperate with intake ports 23' and 24' suitably formed in and connected with the casing 4. The head 21c is disposed at the rear end of the tubular body portion 21 and has connected therewith a disk or plate 27 carrying an annular series of spaced arms 28 connected at their outer or rear ends by a disk or head 29, said parts 27, 28 and 29 forming an adjusting frame or spider connected with the valve, the spaces between the arms of which are in communication with the rear end of the valve chamber 4 and form passages for the flow of motive fluid to the intake passage 23. The head 21a is formed with a central opening 21d receiving a bearing projection 21e on the wall at the closed side of the casing whereby the valve is accurately centered for easy rotation. A head 30 closes the rear end of the valve chamber 4 and has a stuffing box 31 through which passes a shaft 32 connected with the disk or head 29 whereby rotary movements may be imparted to the valve 20 to adjust the same for controlling operations. The means for adjusting the valve may consist of a lever handle 33 or other suitable means applied to the outer end of the shaft 32.

By means of this handle the valve 20 may be adjusted to a cut off position in which its ports are out of register with the ports 18, 19 and 18', 19', to stop the operation of the motor and to lock the gears in whatever position they may be at the time. The valve 20 may also be adjusted to connect the ports 25 and 25' with the ports 18 and 19' for supplying fluid to drive the gears 7 and 8 in a clockwise direction, while the ports 26 and 26' simultaneously communicate with the ports 18' and 19 for the discharge and return of the fluid to the source of supply. The valve may be turned from this position to a reverse position in which the valve ports 25 and 25' communicate with the ports 18' and 19 and the valves 26 and 26' communicate with the ports 18 and 19' for reversing the direction of flow of the fluid for driving the gears 7 and 8 in a counter-clockwise direction. In either working position of the valve the valve ports may be adjusted either to completely or partially communicate with the casing ports for supplying a maximum quantity of fluid to the motor gears to drive the same at maximum speed or to regulate the amount or volume of fluid supplied thereto to drive the gears at any speed between maximum and minimum. Also the valve may be adjusted in either of its working positions to cut down the flow of fluid or to throttle its flow to exert a greater or less braking action on the gears to reduce their speed to any extent desired. By completely closing the valve any amount of the pressure fluid which may be contained in the motor chamber will be maintained therein, whereby the gears will be locked from rotation to prevent movement of the drive shaft and the machinery or machine element driven thereby. The valve structure disclosed thus provides a means whereby the motor may be driven at any speed and reversed in action or braked to any degree or locked against movement. It will accordingly be seen that the drive shaft and the machine element or either part driven thereby may be driven with a high degree of flexibility as to speed variation and controlled to increase or reduce its speed as occasion requires or to lock it entirely against motion. The motor as thus constructed is adapted for driving any type of machine element or kind or machinery directly mounted thereon or any suitable gear connection therewith so that the working action of the driven element or machine may be governed to a very high degree.

In Figs. 11 to 15, inclusive, I have shown the embodiment of the invention in a motor 1a for driving the wheel of an automobile or like vehicle, and especially designed for that purpose. This motor 1a, one of which is used in connection with each wheel to be driven, may be of the same general structure as that previously described except that the cover plate 5' of the motor casing is provided with a bearing extension 34 through which the drive shaft 9' projects. This extension 34 forms a support for bearings 35 on which rotate the wheel carrying hub 36, having a flange 37 for the attachment of the vehicle wheel thereto. The outer end of the hub 36 is closed by a centrally apertured driver-plate 38 the central opening of which receives the outer end of the shaft 9' which is suitably coupled thereto for a driving action, the coupling connection shown in the present instance comprising gear teeth-like keys 39 engaging key-seats or recesses in the driver-plate by which the motion of the shaft is transmitted to the hub to drive the wheel. The opening in the driver plate is closed by a screw threaded cap or other suitable closure member 40. The motor structure may be further modified by the provision, if desired, of oil channels 41 leading from the oil inlet of the oscillatory control valve and from opposite points of the gear chamber to the inner bearing of the shaft 9' from which the oil will be distributed to the bearing members supporting such end of the shaft and to the surfaces of the spindle and outer bearing members. The operation of this motor will be readily understood from the previous description with respect to the operation of the motor 1. In the use of the motor 1a as a wheel drive for an automobile, it will be understood that a motor will be provided for driving each wheel, and that by the use of such motors either a two-wheel drive or a four-wheel drive may be provided. The valves of these motors may in practice be controlled by a lever or other control means 33' coupled to a connection 42 arranged to be conveniently operated by the driver so that the supply of fluid from the source to the motors may be controlled to govern the driving and braking actions as desired.

From the foregoing description, taken in connection with the drawings, the construction and mode of operation of my improved hydraulic gear motor will be readily understood without a further and extended description, and it will be seen that a simple, reliable and efficient construction of motor of this type is provided whereby a maximum amount of power may be transmitted at any and all speeds and a flexible driving action, under complete control of the driver or operator obtained in a simple and convenient manner. While the construction disclosed is preferred it will, of course, be understood that changes in the form, construction and arrangement of the parts may be made within the scope of the appended claims, without departing from the spirit or sacrificing any of the advantages of the invention.

What I claim is:

1. A gear type hydraulic motor comprising a casing normally open at one side and closed at its opposite side, said casing having a central gear chamber and side gear chambers in communication with said central chamber, a plate closing the open side of the casing, said plate and the wall of the closed side of the casing being provided with bearing recesses in line with the respective chambers, a valve casing carried by and disposed in axial alinement with said wall, the wall having two sets of intake and discharge ports connecting the inner end of the valve chamber with said gear chambers and said valve chamber having at its outer end an intake port and at a point intermediate of its length an exhaust port, intermeshing central and side gears in the gear chamber, shafts carrying anti-friction bearing members in the recesses in line with the central gear chamber, shafts carrying said gears and journaled in the bearing recesses in the plate and wall of the closed side of the casing, the recess formed in the plate in line with the central gear chamber being normally open at its outer side, a detachable closure for said open side of said recess confining the anti-friction bearing member therein in place, and a rotary valve in said valve chamber having a longitudinally extending intake passage communicating at its outer end with said intake port in the valve casing and provided at its inner end with branches for communication with the inlet ports in the casing and having an exhaust communicating with the exhaust port in the valve casing and provided with branches for communication with the discharge ports in the casing.

2. A gear type hydraulic motor comprising a casing normally open at one side and closed at its opposite side, said casing having a central gear chamber and side gear chambers in communication with said central chamber, a plate closing the open side of the casing, said plate and the wall of the closed side of the casing being provided with bearing recesses in line with the respective chambers, a valve casing carried by and disposed in axial alinement with said wall, the wall having two sets of intake and discharge ports connecting the inner end of the valve chamber with said gear chambers and said valve chamber having at its outer end an intake port and at a point intermediate of its length an exhaust port, intermeshing central and side gears in the gear chamber, shafts carrying anti-friction bearing members in the recesses in line with the central gear chamber, shafts carrying said gears and journaled in the bearing recesses in the plate and wall of the closed side of the casing, the recess formed in the plate in line with the central gear chamber being normally open at its outer side, and provided with a packing chamber at its side adjoining the central gear chamber, a flange on the shaft of the central gear occupying the packing chamber and serving to prevent leakage of lubricant between the central gear chamber and said recess and to hold said shaft from outward axial movement, a detachable closure for said open side of said recess confining the anti-friction bearing member therein in place, and a rotary valve in said valve chamber having a longitudinally extending intake passage communicating at its outer end with said intake port in the valve casing and provided at its inner end with branches for communication with the inlet ports in the casing and having an exhaust communicating with the exhaust port in the valve casing and provided with branches for communication with the discharge ports in the casing.

3. A gear type hydraulic motor comprising a casing normally open at one side and closed by a side wall at its opposite side, said casing having a central gear chamber and side gear chambers in communication therewith, a plate closing the open side of the casing, intermeshing central and side gears in the central and side gear chambers, the said wall at the closed side of the casing being formed with two sets of intake and discharge ports communicating with the gear chambers, a cylindrical valve chamber integral with said wall and arranged in axial alinement with the central gear chamber, said wall being provided with a centering and bearing projection extending into the valve chamber and said valve chamber having at its outer end an intake port and at a point intermediate of its length an exhaust port, and a rotary valve in said chamber comprising a cylindrical body having inner, outer and intermediate heads in peripheral bearing contact with the inner surface of the body of the chamber and having a longitudinal intake passage communicating at its outer end with the intake port of the chamber, the said inner head being formed with an opening receiving said centering and bearing projection and said inner and intermediate heads being spaced to form an exhaust passage about the valve body communicating with the exhaust port in the valve chamber, said valve between said inner and intermediate heads being partitioned to provide radial intake ports and longitudinal exhaust ports communicating respectively with its intake and exhaust passages and adapted for connecting the same through rotary movements of the valve with said intake and exhaust ports in said wall at the closed side of the casing.

GEORGE W. WILKIN.